No. 651,718. Patented June 12, 1900.
H. LELEUX.
METHOD OF ELECTRICALLY TREATING ORES OF NICKEL, &c.
(Application filed June 12, 1899.)
(No Model.)
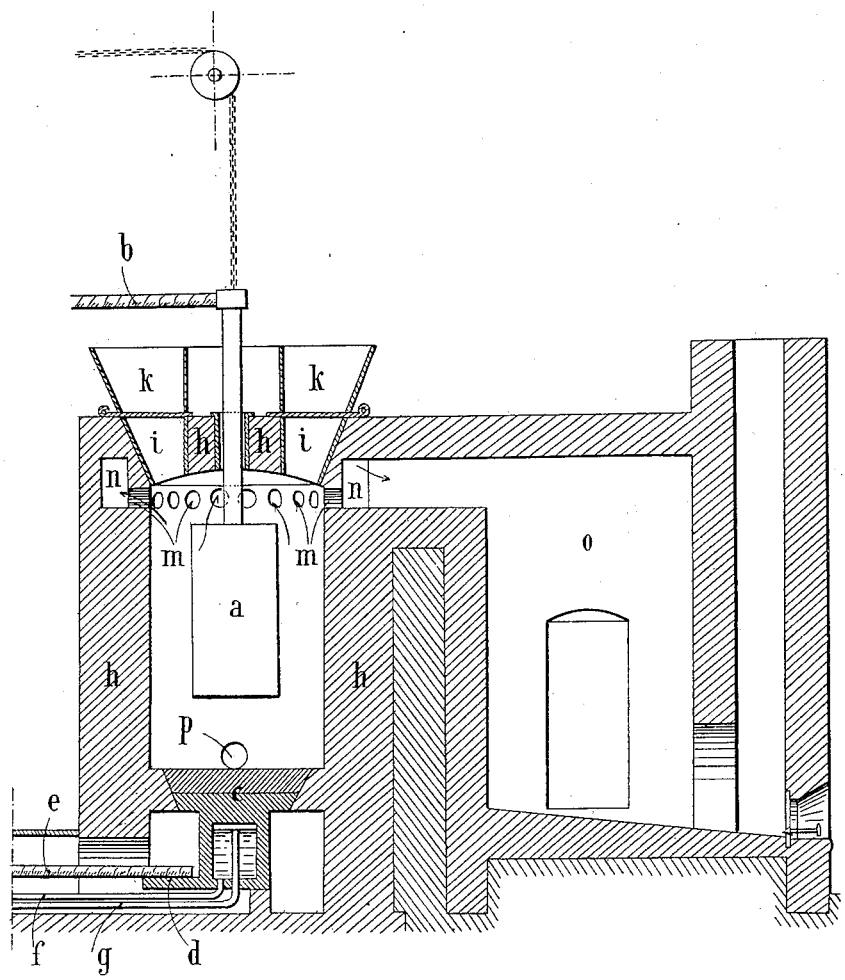
Witnesses.
Inventor.
Henri Leleux.
By James L. Norris.
Atty.

UNITED STATES PATENT OFFICE.

HENRI LELEUX, OF PARIS, FRANCE, ASSIGNOR TO LA COMPAGNIE ELECTRO-MÉTALLURGIQUE DES PROCÉDÉS GIN ET LELEUX, OF SAME PLACE.

METHOD OF ELECTRICALLY TREATING ORES OF NICKEL, &c.

SPECIFICATION forming part of Letters Patent No. 651,718, dated June 12, 1900.

Application filed June 12, 1899. Serial No. 720,239. (No model.)

*To all whom it may concern:*

Be it known that I, HENRI LELEUX, a citizen of France, residing at Paris, France, have invented certain new and useful Improvements in Electrical Treatment of the Ores of Nickel, Cobalt, Silver, Lead, and Copper, of which the following is a specification.

This invention relates to an improved method for electrically treating nickel, cobalt, silver, lead, and copper ores whereby a considerable economy as compared with the modes of treatment now in use may be effected. Although the means of extraction of these metals vary considerably according to the richness of the ores and the nature of the gangues, they always comprise a series of roastings and fusions in themselves expensive and rendered still more so by the addition of fluxes and by the formation of mattes of subsulfids which have to be further treated.

My invention, which is applicable to ores of various compositions, consists in introducing into an electric resistance-furnace electrodes of a metal whose heats of combination with the ores which contain the metals to be liberated are higher than those of these latter metals. Under these conditions the function of the electric current, which may be continuous or alternating, consists simply in supplying the amount of energy necessary to bring the ore to such a temperature as to effect the reaction, the substitution of the metal of the electrodes then taking place spontaneously without the current intervening otherwise than to prepare and facilitate this substitution and to permit of the continuity of the operations. Let us suppose in order to simplify the explanations that it is a question of dealing with argentiferous galena. All that will be said will apply equally well to a simple or complex ore of copper or nickel containing these metals or analogous metals combined with sulfur, arsenic, or antimony. It is useless, and this is an important point to bring out, to subject the ore to any preliminary fusion or roasting. Let us subject this ore to igneous fusion in an electric furnace, wherein it will form a resistance between the electrodes, which will be of iron, for the application now under consideration. The sulfureted, arseniureted, and antimoniureted compounds of lead, silver, copper, and nickel will be decomposed by the iron at the temperature generated by the electric current. The iron will liberate these metals at the same time as it will form sufid, sulfarsenids, and sulfantimonids. As all these reactions of the type $MS + Fe = FeS + M$ comprise an exothermic disengagement, the amount of electric energy to be brought into play will be very little and will correspond only to the expenditure of heat necessary to bring the ore to and to maintain it in the state of fusion, allowance being made for the calorific gain resulting from these exothermic reactions. On the other hand, even if the cost of the energy is somewhat high the operation will leave a satisfactory profit, owing to the intrinsic value of the liberated metals, whose equivalent weights, moreover, are greater than that of the metal consumed in the form of electrodes. In order to complete these explanations and so that my invention may be better understood, I give hereinafter, by way of example, the description of an electric furnace wherein I effect the treatment of ores; but it is to be understood that the present invention does not reside in the construction of the furnace described, as it may be carried out in any other suitably-arranged electric furnace.

The annexed drawing represents a transverse section of the furnace.

The furnace comprises, essentially, a movable iron electrode $a$, receiving the current through the stranded cable $b$, and a fixed electrode $c$, having a projection $d$ for connection with the cable $e$ for the return of the current.

The electrode $c$, forming the hearth, must be so chosen that at the temperature of reaction, which depends upon the nature of the metal or metals to be liberated, there cannot be produced a combination or an alloy between such metal or metals and the material of the hearth. The most simple plan is evidently to take the same metal for the lower electrode as that which is to be produced; but for metals incapable of forming carburized combinations—such as lead, silver, or copper—a carbon hearth may advantageously be employed. In the drawing I have shown an arrangement for the most complicated case—that in which the ore of nickel is to be treated. In this case the hearth is faced with nickel, and the lower part is of cast-steel and is so arranged that a circulation of water can be established therein, cold water entering through the pipe $f$ and leaving through the pipe $g$. The wall of the furnace is constituted of refractory masonry $h$ of bauxite bricks. The upper arch is provided with openings $i$, communicating with the feed-hopper $k$ for the ore. These openings may be closed by slides to prevent the gaseous products escaping into the air. At the lower part of the crucible the brickwork is provided with orifices $m$, leading into a collecting-passage $n$, through which the volatilized matters (arsenic, sulfid of arsenic, arsenid of iron, &c.) pass into the condensation-chamber $o$, wherein they are collected. A small quantity of coarsely-broken ore is thrown into the furnace, the current is switched on, and a bath is formed in which the reactions above indicated are immediately produced. The metals freed by the iron unite at the bottom of the bath, while the sulfid or arsenid of iron floats on the surface. The feeding is continued at suitably-regulated intervals, and when the metallic bath has attained a certain thickness the tap-hole $p$ is opened and the metal run into an ingot-mold.

What I claim as my invention is—

The herein-described method of electrically treating nickel, cobalt, silver, lead, and copper ores, for obtaining the required metal without any preliminary roasting or fusion, which consists in placing the ore to be treated into contact with electrodes of a metal whose heats of combination with the non-metallic constituents of the ore which contains the metal to be liberated are higher than the heats of the said metal to be liberated, and then passing through said electrodes and ores an electric current acting only as a source of heat for bringing the ore to such a temperature as to cause the suitably-chosen metal of one of the electrodes to unite, by exothermic reaction, with the metals that are associated with the particular metal to be liberated.

In testimony whereof I have hereunto set my hand in presence of two subscribing witnesses.

HENRI LELEUX.

Witnesses:
EDWARD P. MACLEAN,
ALFRED FREY.